March 17, 1931. A. KALTENBACH ET AL 1,796,463
CUTTING MACHINE WITH REVOLVING KNIFE
Filed Oct. 31, 1928
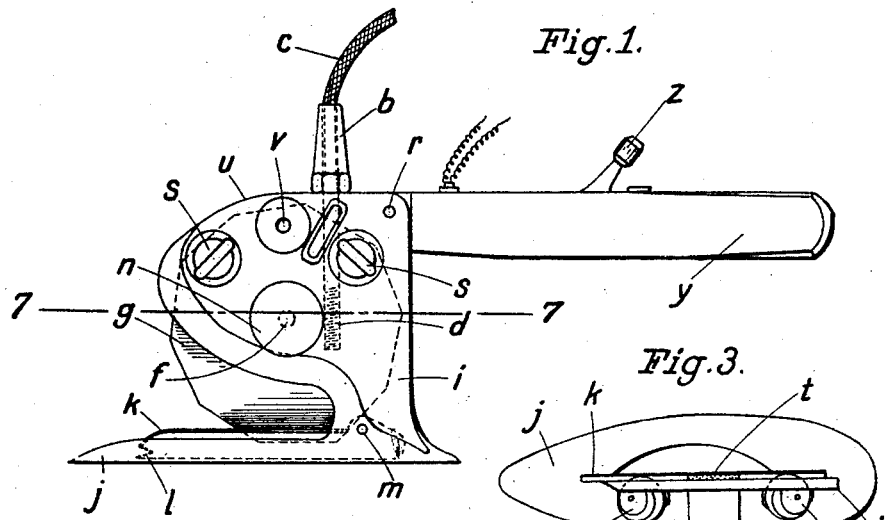
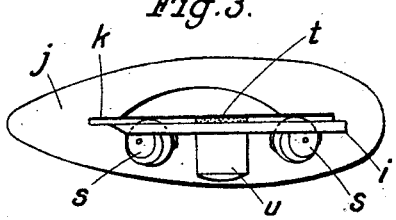
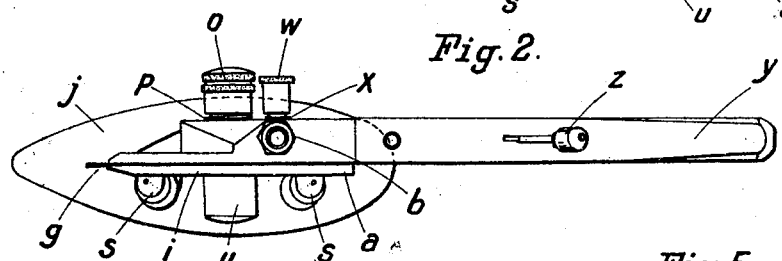
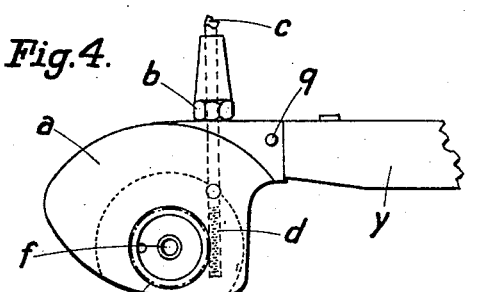
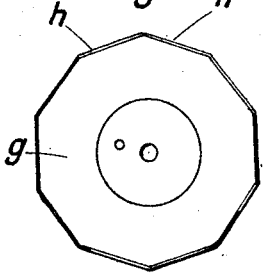
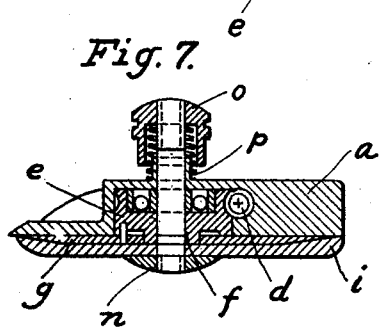
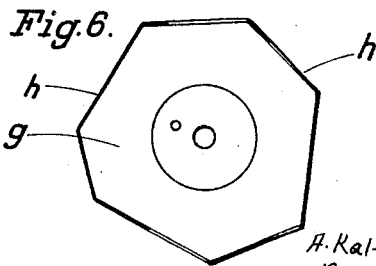
Inventors:
A. Kaltenbach &
R. Voigt
By: Marks & Clark
Attys.

Patented Mar. 17, 1931

1,796,463

UNITED STATES PATENT OFFICE

ALOIS KALTENBACH AND RICHARD VOIGT, OF POTSDAM, GERMANY

CUTTING MACHINE WITH REVOLVING KNIFE

Application filed October 31, 1928, Serial No. 316,236, and in Germany November 25, 1927.

This invention relates to a cutting machine with revolving knife, which is adapted more particularly for cutting textile fabrics but is also capable of being used for cutting metal, wood, leather, paper and the like.

In machines having a circular knife bevelled on the periphery, it has been found that notwithstanding high speeds of revolution of the circular knife a smooth cut cannot be obtained, for in the known machines of this type the knife revolves in the manner of a circular saw in a slot in a guiding or sliding piece, and the guiding piece slides along underneath the material that is to be cut through. The cutting action obtained in such machines is essentially the same as is brought about in the case of a knife drawn over the material.

According to the present invention, on the knife of the cutting machine at the position at which the actual cutting is effected a co-acting blade is arranged, which co-operates with the revolving knife like a pair of scissors.

A still better cutting action can be obtained if the revolving knife is constructed in the shape of a polygon, so that cutting edges are obtained which are in stepped relationship to one another and which then co-operate in a scissor-like manner with the co-acting edge. With a circular knife the cutting angle is always of the same magnitude. Hence it is not possible to adjust the knife and the co-acting edge always to the most advantageous angle, so that the material, as the cutting head is fed forward, becomes partially bunched up and is torn instead of being cut up smoothly. By the mutually stepped cutting edges of the revolving knife the result is obtained that the cutting angle between the circular knife and the co-acting edge is continually changing and the cut is effected as soon as the most advantageous cutting angle has been adjusted.

The length of the cutting edges depends upon the thickness of the material or of the layers of material to be cut. The thinner the layer of material to be cut, the shorter the individual cutting edges of the revolving knife may be kept.

Circular knives in the shape either of a regular or of an irregular polygon may be employed. The regularly shaped knives permit of a smooth and rapid cutting of the material, particularly in the case of thin material, while in the case of thicker material it may be preferable to use circular knives in the shape of an irregular polygon.

The cutting machines according to the present invention are preferably so constructed as to enable the knives to be simply and conveniently changed, so that they may be suitable for any purpose for which it is desired to employ them. The co-acting blade is preferably exchangeably arranged in the sliding member or sliding foot guided underneath the material.

Furthermore the revolving knife is constantly pressed against the co-acting blade with a definite pressure by means of a spring. In order to prevent the blade from becoming canted or twisted and to make it revolve exactly parallel to the co-acting edge, it is guided at one or more points on its surface upon rollers or balls, which are preferably arranged on or in the bridge piece of the detachable sliding foot. The rollers or balls are furthermore preferably fitted in such a way that they are located diametrically opposite to the co-acting edge.

Since a statisfactory co-operation of the blade with the co-acting edge is only ensured when the blade is constantly provided with a lubricant at the points at which it comes into contact with the co-acting edge a felt plug is according to the invention inserted in the bridge piece of the sliding foot, which serves as a cover plate, the said felt plug being saturated with oil and constantly bearing against the knife. The felt plug is closed externally by a bush which is provided with a lubricating hole.

A cutting machine according to the present invention is illustrated by way of example in the accompanying drawings, in which—

Fig. 1 shows the cutting machine in side elevation and Fig. 2 in plan.

Fig. 3 shows the sliding foot in plan, and

Fig. 4 shows the machine in side elevation with the sliding foot and the knife removed.

Fig. 5 shows in side elevation a knife in the form of a regular polygon, and

Fig. 6 shows another knife also in side elevation in the form of an irregular polygon.

Fig. 7 is a horizontal section on the line 7—7 of Fig. 1.

In a case-like machine body $a$, which may consist of aluminium or some other light metal, in order that the cutting machine may be as light as possible, is arranged the drive for the revolving knife. The driving is preferably effected from an electric motor through a flexible shaft which is coupled in the interior of a support $b$ located on the upper side of the machine body $a$ to a driving shaft $c$, which carries at its end a worm $d$. The worm meshes with a worm wheel $e$, upon the shaft $f$ of which is mounted the revolving knife $g$. The revolving knife, in the constructional form illustrated, is in the shape of a regular polygon, so that it has distinct cutting edges $h$ in stepped relationship to one another. The front of the knife $g$ is concealed by the bridge piece $i$ of a sliding foot $j$, which slides underneath the material to be cut. The sliding foot is preferably made flat and in the shape of a small flat-iron. The sliding foot and the bridge piece, like the machine body, may be made of aluminium or some other light metal. In the sliding foot $j$ is exchangeably arranged a co-acting blade $k$. The front end of the co-acting blade is pointed and is located in a suitable recess $l$ in the sliding foot $j$. The rear end of the co-acting blade is held in the recess in the sliding foot by a grub screw $m$. Hence the co-acting blade can be removed from the sliding foot by releasing a single screw, and replaced by a fresh blade.

The bridge piece $i$ of the sliding foot $j$ is connected with the machine body by means of a screw $n$, which passes through the hollow worm-wheel shaft $f$ and the machine body $a$. In the interior of a nut $o$, which clamps the screw $n$, is arranged a spring $p$, so that the co-acting blade can be tightened on to the revolving knife $g$ with a definitely adjustable pressure. In order to prevent the bridge piece and the sliding foot from twisting relatively to the machine body there is provided on the machine body a pin $q$, which engages in a corresponding hole $r$ in the bridge piece of the sliding foot. By this means the position of the sliding foot in relation to the machine body is precisely determined.

The revolving knife $g$ is prevented from canting by rollers $s$, which are rotatably supported in the bridge piece $i$ of the sliding foot $j$, and project a little on the side facing the blade. In the constructional form illustrated two guiding rollers $s$ are provided, these guide rollers being arranged diametrically opposte to the co-acting edge.

The lubricating of the revolving knife, which is necessary for the satisfactory co-operation thereof with the co-acting blade, is effected by means of a felt plug $t$, which is arranged in the bridge piece $i$ of the sliding foot. The felt plug is surrounded by a bush $u$ mounted on the bridge piece $i$, and can be saturated with oil through a hole $v$ in the bush.

The lubricating of the worm and worm wheel is effected through a bush $x$, which is arranged on the rear of the machine body and which is closed by a cap $w$.

On the machine body $a$ is mounted a handle $y$, which is preferably made of insulating material, such as vulcanite.

To facilitate the use of the machine there is arranged in the handle a switch $z$ by which the current of the driving motor can be switched on and off.

What we claim is:—

1. A cutting machine, more particularly for textile materials, comprising a revolving knife, a co-acting blade adapted to co-operate with the revolving knife in the manner of a pair of scissors, and rolling elements such as rollers bearing against one side of the revolving knife to prevent it from canting.

2. A cutting machine, more particularly for textile materials, comprising a revolving knife, a co-acting blade adapted to co-operate with the revolving knife in the manner of a pair of scissors, and rollers bearing against one side of the revolving knife, at points diametrically opposite to the co-acting blade, to prevent the revolving knife from canting.

3. A cutting machine, more particularly for textile materials, comprising a casing having a revolving knife therein, a slide foot, a bridge piece on the slide foot, the said bridge piece covering the front of the revolving knife, a co-acting blade adapted to co-operate with the revolving knife in the manner of a pair of scissors, the co-acting blade being removably mounted in the slide foot, and rollers rotatably supported in the bridge piece and bearing against one side of the revolving knife to prevent it from canting.

4. A cutting machine, more particularly for textile materials, comprising a casing having a revolving knife therein, a slide foot, a bridge piece on the slide foot the said bridge piece covering the front of the revolving knife, a co-acting blade carried by the slide foot and adapted to co-operate with the revolving knife in the manner of a pair of scissors, a sleeve mounted on the bridge piece at one side of the revolving knife, and a plug of felt saturated with lubricant, lodged in the said sleeve and bearing against the side of the revolving knife to lubricate it.

5. A cutting machine, more particularly for textile materials, comprising a casing having a revolving knife therein in the shape of a regular polygon, a slide foot, a bridge piece on the slide foot, the said bridge piece covering the front of the revolving knife, a co-acting blade carried by the slide foot and adapted to co-operate with the individual edges of the polygonal revolving knife in the manner of a pair of scissors, the co-acting blade being removably mounted in the slide foot, rollers rotatably supported in the bridge piece and bearing against one side of the revolving knife, at points diametrically opposite to the co-acting blade, to prevent the revolving knife from canting, a sleeve mounted on the bridge piece at one side of the revolving knife, and a plug of felt saturated with lubricant, lodged in the said sleeve and bearing against the side of the revolving knife to lubricate it.

6. A cutting machine, more particularly for textile materials, comprising a recessed casing a polygonal revolving knife therein, a slide foot, a bridge piece on the slide foot overlying said recess and secured to said casing, a coacting blade carried by the slide foot and adapted to co-operate with the individual edges of the polygonal revolving knife in the manner of a pair of scissors.

7. A cutting machine, more particularly for textile materials, comprising a casing having a revolving knife therein, a slide foot, a bridge piece on the slide foot the said bridge piece covering the front of the revolving knife, a coacting blade carried by the slide foot and adapted to co-operate with the revolving knife in the manner of a pair of scissors, the coacting blade being removably mounted in the slide foot.

8. A cutting machine, more particularly for textile materials, comprising a casing having a revolving knife therein, a slide foot, a bridge piece on the slide foot the said bridge piece covering the front of the revolving knife, a coacting blade carried by the slide foot and adapted to co-operate with the revolving knife in the manner of a pair of scissors and resilient means for pressing the revolving knife on one side against the co-acting blade.

In testimony whereof we have signed our names to this specification.

ALOIS KALTENBACH.
RICHARD VOIGT.